April 8, 1941.  G. F. RYAN  2,237,449
CLICKING MACHINE
Filed Jan. 27, 1940  7 Sheets-Sheet 1

INVENTOR:
George F. Ryan
By his Attorney
Victor Cahll

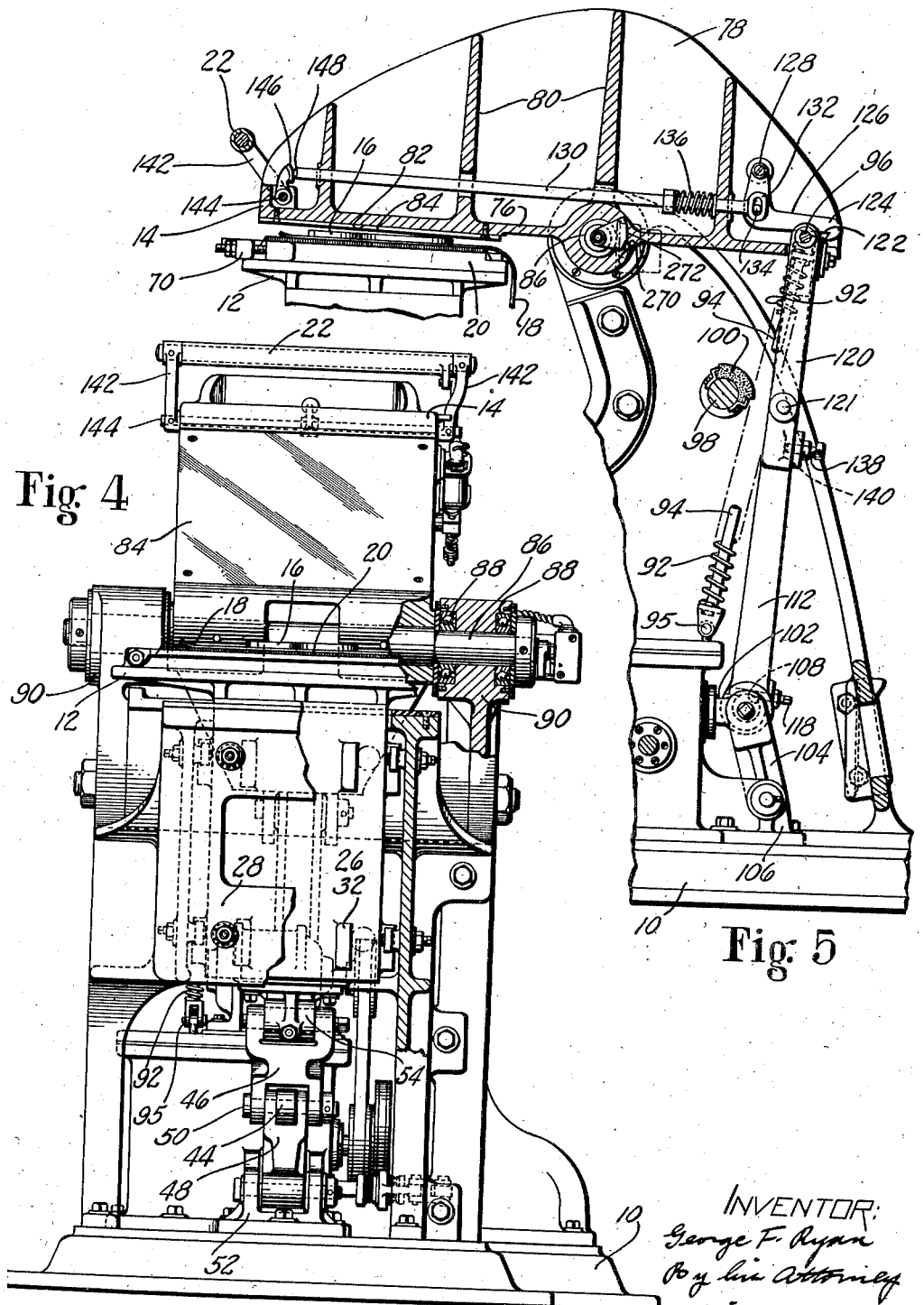

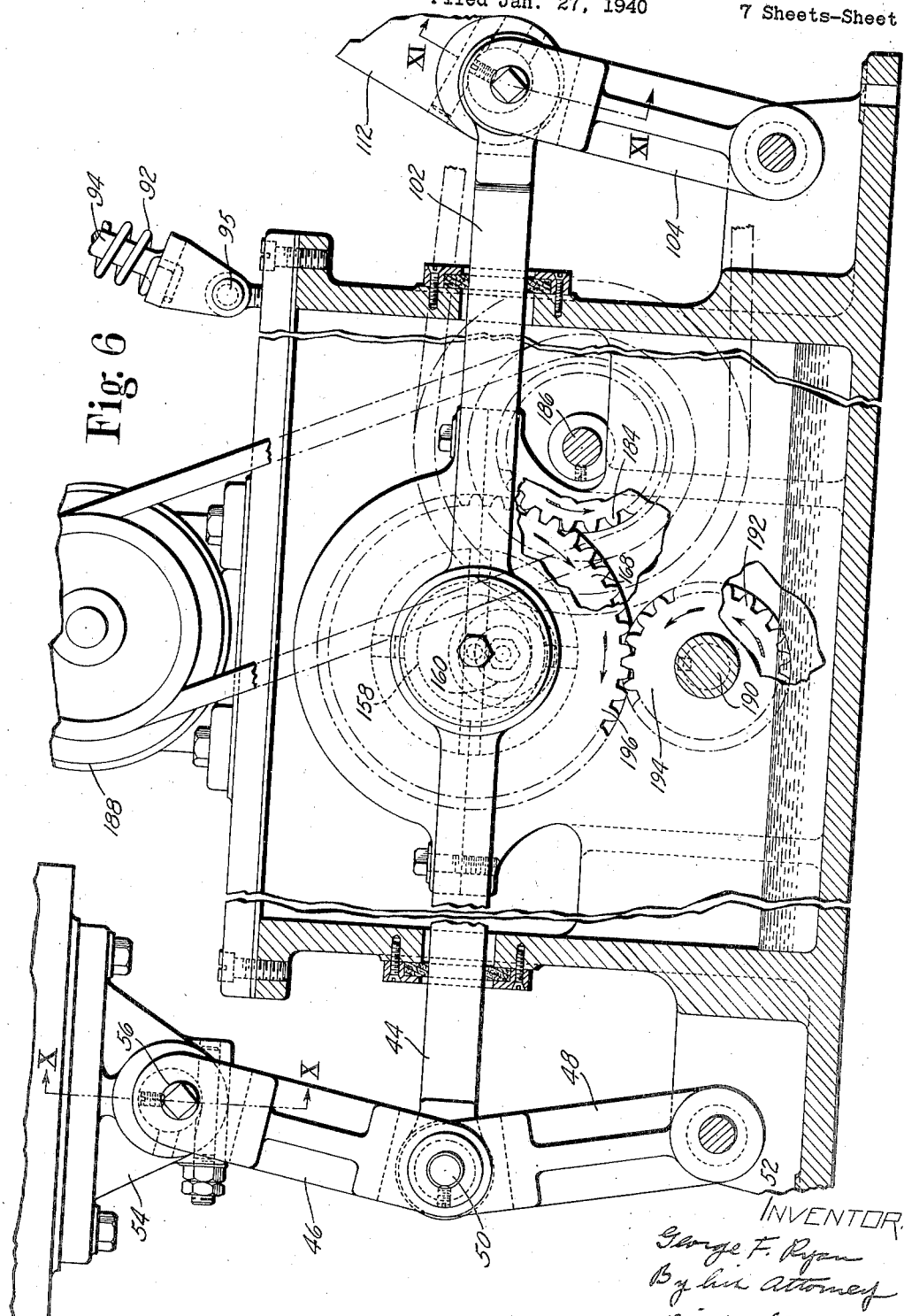

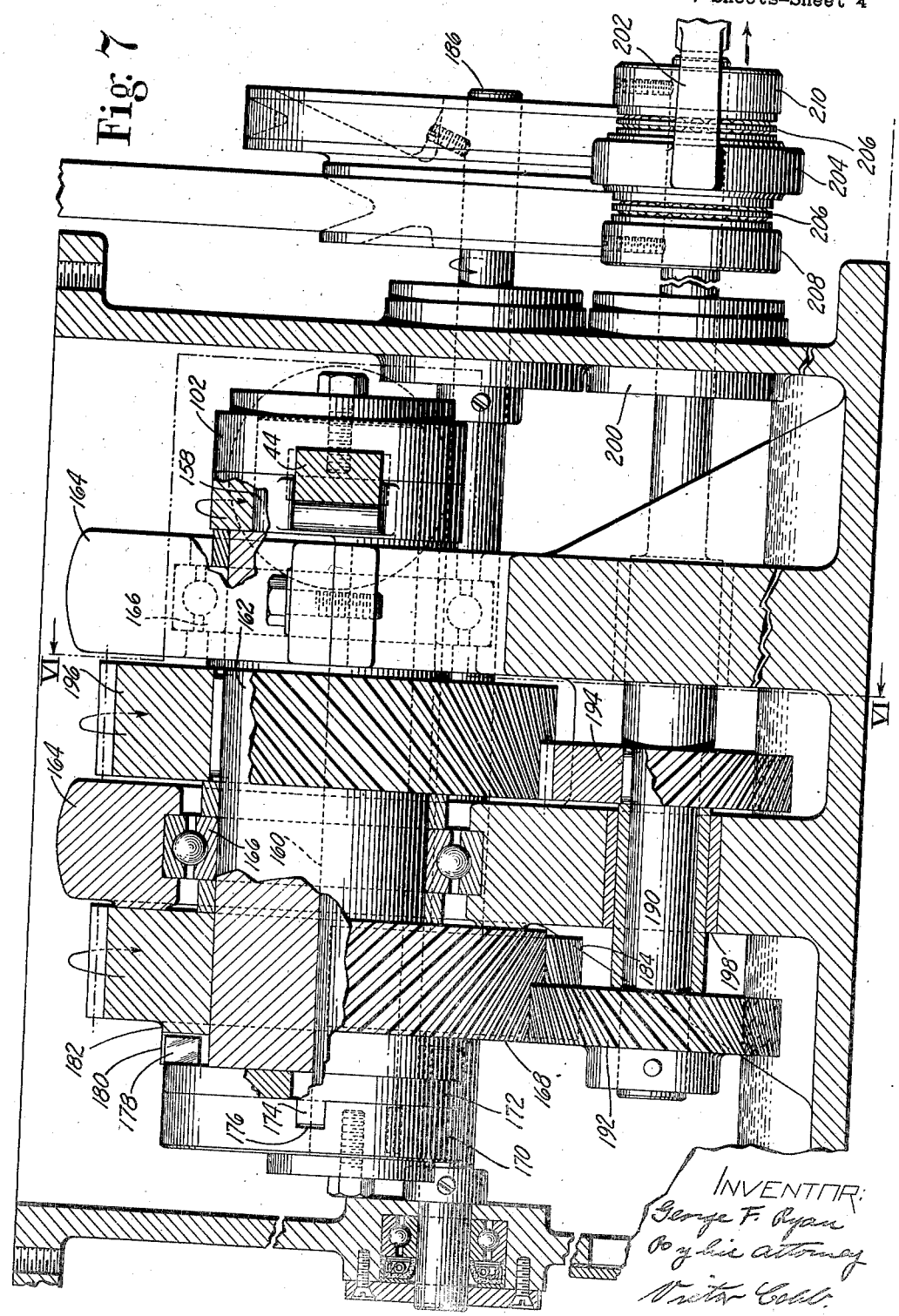

April 8, 1941.  G. F. RYAN  2,237,449
CLICKING MACHINE
Filed Jan. 27, 1940   7 Sheets-Sheet 5

INVENTOR:
George F. Ryan
By his Attorney
Victor Cahl.

April 8, 1941.    G. F. RYAN    2,237,449
CLICKING MACHINE
Filed Jan. 27, 1940    7 Sheets-Sheet 6

INVENTOR:
George F. Ryan
By his Attorney
Victor Cobb

Patented Apr. 8, 1941

2,237,449

UNITED STATES PATENT OFFICE 2,237,449

CLICKING MACHINE

George F. Ryan, Peabody, Mass., assignor to United Shoe Machinery Corporation, Borough of Flemington, N. J., a corporation of New Jersey Application January 27, 1940, Serial No. 315,950

31 Claims. (Cl. 164—19)

This invention relates to presses and is herein illustrated as embodied in a press of the type commonly referred to as a clicking machine, which is used to cut blanks such as shoe part blanks from leather, fabric or other sheet material.

Machines of the type referred to commonly comprise a cutting bed and a presser arm mounted for movement toward and away from the bed in producing dieing-out operations upon sheet material supported by the bed. It is an object of the present invention to provide an improved clicking machine which will be so constructed as to facilitate the handling of material to be cut into blanks, and which will be particularly effective in performing cutting operations rapidly and economically, while at the same time ensuring safety to the operator.

To this end and as illustrated, I have provided a clicking machine having a bed and a presser arm mounted upon a horizontal axis for movement toward and away from the bed, together with means for causing a pressure-applying operation of the presser member after the presser member has been brought into a predetermined position relatively to work upon the cutting bed. By mounting the presser member upon a horizontal axis, the member can be moved into an out-of-the-way position, so that all portions of the cutting bed are exposed to view of the operator, thus considerably facilitating the positioning of material upon the bed and the placing of the die in proper position to cut the material, both with relation to previous cuts made and with regard to the characteristics of the material itself. The mechanism above referred to for operating the presser member is preferably arranged so that a power stroke of the presser member will not occur until the member has been brought down so close to the bed that the operator cannot insert his fingers between the presser member and the bed, thus eliminating a possible source of accident inherent in some clicking machines as heretofore constructed.

Preferably and as shown, the bed is mounted for movement heightwise of the frame of the machine simultaneously with movement of the presser arm toward the bed, with the result that the presser member and bed are brought toward each other rapidly at the moment the die is being forced through the material to cut a blank. As as a result, the speed of cutting the material is increased for a given speed of operation of the source of power of the machine, which contributes to clean cutting of the material.

Furthermore, the presser member is arranged, upon initial operation of a manual starting device, to be connected by a latch to means for applying power in producing a pressure stroke. This latch is releasable permitting the presser member to be swung about its axis away from the bed. Such construction is advantageous in that, if the operating parts are stalled with the presser member in engagement with a die on the bed, as might happen through carelessness of an operator in utilizing too high a die or in improper adjustment of the height of the bed, the presser arm can be readily released.

These and other features of the invention will be apparent from the following specification when taken in connection with the accompanying drawings, and will be pointed out in the claims.

In the drawings,

Fig. 4 is a view in front elevation, partly in cross section, of the machine shown in Fig. 1;

Fig. 5 is a view in side elevation, partly in section, of a portion of the machine shown in Fig. 1 with the presser arm located in operative position relatively to the work;

Fig. 6 is an end view, partly in section, of a portion of the mechanism for driving the work support and presser member;

Fig. 7 is a view in side elevation, partly in section, of a portion of the driving mechanism;

Figures 1, 2, 3:
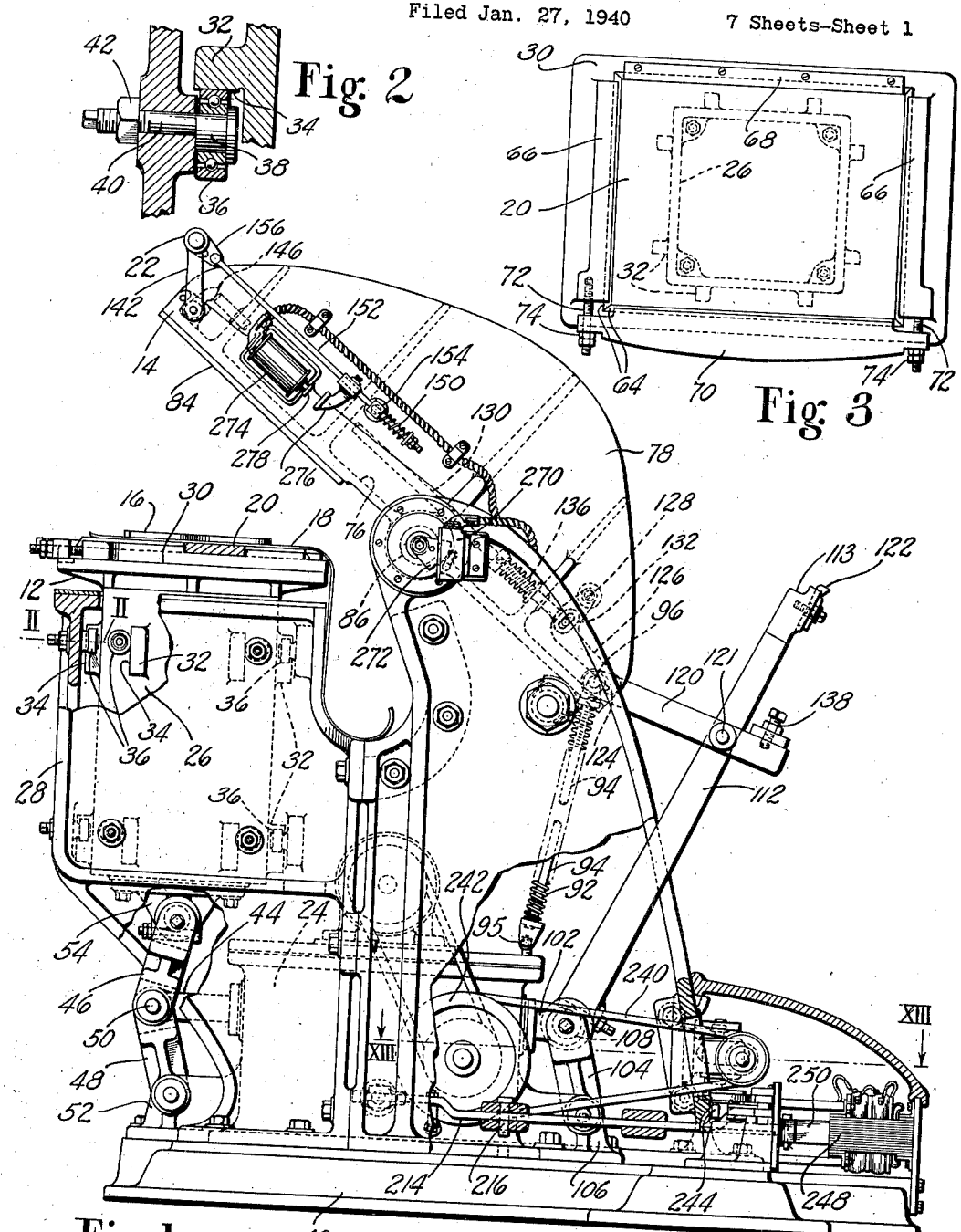
Fig. 1 is a view in side elevation, partly in cross section, of a clicking machine embodying one form of my invention.
Fig. 2 is a view taken along section II—II of Fig. 1 and illustrates a work support guiding device.
Fig. 3 is a plan view of the work support and cutting block.

The illustrated machine comprises a frame 10 (Figs. 1 and 5) carrying a table or work support 12 mounted for movement heightwise of the frame, and a presser member 14 pivotally mounted on the frame and movable, about a horizontal axis, angularly toward or away from the table to cooperate therewith in producing pressure applying operations upon a die 16 located upon sheet material, such as leather 18, positioned upon a cutting block 20 carried by the table, thereby to cut blanks such as shoe part blanks from the material. The presser member 14 is moved toward the table 12 by means of a hand lever 22 which is also operable to initiate operation of driving mechanism, generally indicated by reference character 24, effective to cause power operation of the table and presser member.

The table or work support 12 comprises a box-like body portion 26 mounted for movement in a heightwise direction in a bracket 28 extending laterally from the frame 10. At the upper end of the body portion is a flat plate 30 arranged to support the cutting block 20. In order to reduce to a minimum friction between the bracket and the body portion of the work support and also to guide the work support in a heightwise direction, there are provided lugs 32 on the body portion having vertically extending machined surfaces 34 arranged to engage ball bearing rollers 36 on the bracket 28. Each of the rollers 36, as shown in Fig. 2, is mounted upon an eccentric 38 in the outer end of a spindle 40 held in the bracket 28 by a nut 42. The pressure between the rollers and the machined surfaces 34 can readily be adjusted by rotating the spindles 40.

Figure 10:
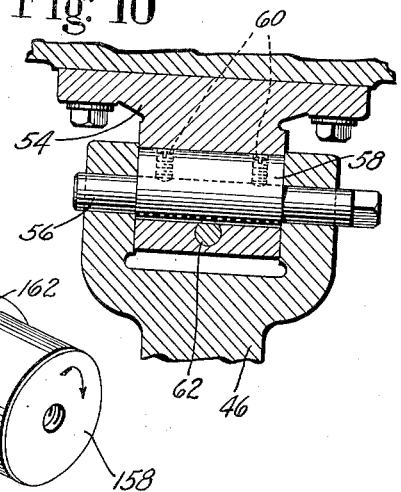
Fig. 10 is a view in cross section taken along the lines X—X of Fig. 6.
Figure 9:
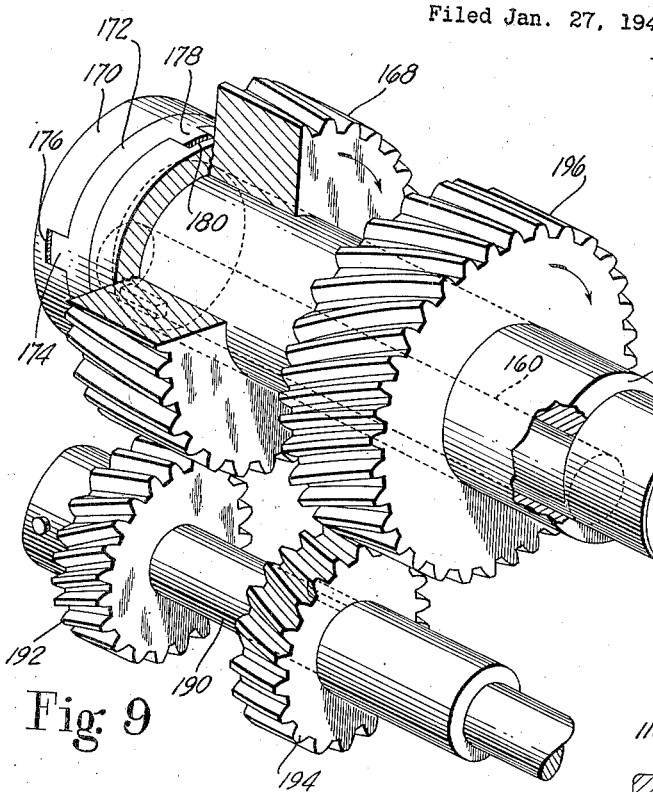
Fig. 9 is a perspective view illustrating parts of the driving mechanism.

The work support 12 is operated by a lever 44 forming part of the driving mechanism 24 acting through toggle mechanism which will now be described. The mechanism 24 comprises links 46 and 48, one end of each link being pivotally mounted upon a pin 50 on the lever 44. The other end of the link 48 is pivoted to ears 52 on the frame 10 and the other end of the link 46 is pivotally connected to an ear 54 on the lower end of the member 26. As shown in Fig. 10, the upper end of the link 46 is forked and carries a pin 56 which has an eccentric 58 secured thereto by set screws 60 and which is positioned in an opening extending through the ear 54. By rotating the eccentric 58 the effective length of the link 46 can be readily varied, the eccentric being locked in adjusted position by a screw 62.

The cutting block 20 (Figs. 1 and 3) is preferably composed of wood and is substantially rectangular in horizontal cross section but has beveled side portions 64. The block is held in position on the work support 12 by two ways 66 which engage two of the beveled sides 64 of the block, by an abutment 68 which engages a third side of the block, and by a locking device comprising a bar 70 adapted to engage a fourth side of the block and mounted upon screw bolts 72 positioned in the ways 66 and arranged to be forced against the block by nuts 74.

The presser member 14 is a casting preferably composed of light metal such as an aluminum alloy and, as shown in Figs. 1, 4 and 5, comprises a base portion 76 from the central portion of which extends a vertical web 78 and laterally extending reenforcing webs 80 which join the base and the vertical web. The forward portion of the presser member is slightly beveled, as shown at 82, and has secured to its under surface a wear plate 84. The purpose of the bevel 82 is to ensure that when the presser member is brought down upon a die such as the die 16, the action of the presser member will be progressive along the die from the rear to the front part of the machine. This contributes to effective cutting by reason of the fact that the successive portions of the edge of the die are forced into the material instead of penetrating it simultaneously over all portions of the edge.

The presser member 14 is secured to a shaft 86 projecting ends of which are supported by ball bearings 88 in upstanding bosses 90 in the frame 10. This construction is such that the presser member is movable angularly about the axis of the shaft 86 so that the striking portion 84 can be brought into cooperative relation with the work support 12. The presser arm is so constructed that its mass is distributed fairly equally on opposite sides of the axis of the shaft so that the rear portion of the member, to a certain extent, acts as a counterbalance for the forwardly extending portion of the member. The presser member is normally positioned with its forward portion disposed upwardly at an angle to the work support, as shown in Fig. 1, in which position the work support is unobstructed with the result that an operator can readily place a die in operative relation to the surface of the work on the support. The presser member is urged into this position by a spring 92 mounted upon spring perches 94 pivotally secured respectively to a portion of the frame at 95 and to a pin 96 at the rearward end of the presser member 14. Angular movement of the presser member under the action of the spring is limited by a stop 98 comprising a bar extending transversely of the machine frame and carrying a buffer 100 preferably composed of resilient material such as sponge rubber.

Figure 11:
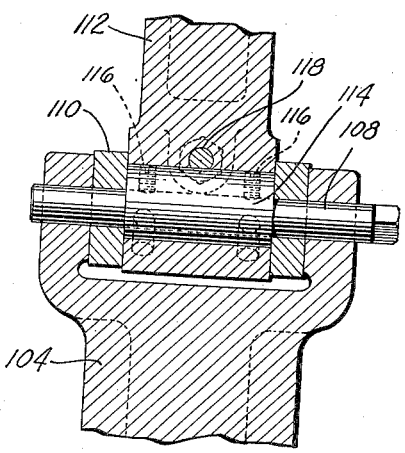
Fig. 11 is a view in cross section taken along lines XI—XI of Fig. 6.
Figure 8:
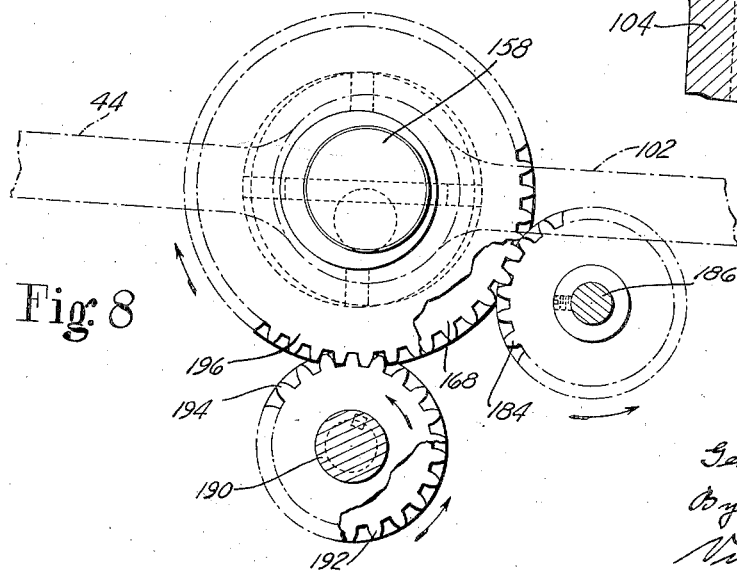
Fig. 8 is a diagrammatic view illustrating the relation of the driving gears and the levers for actuating the toggles.
Figure 12:
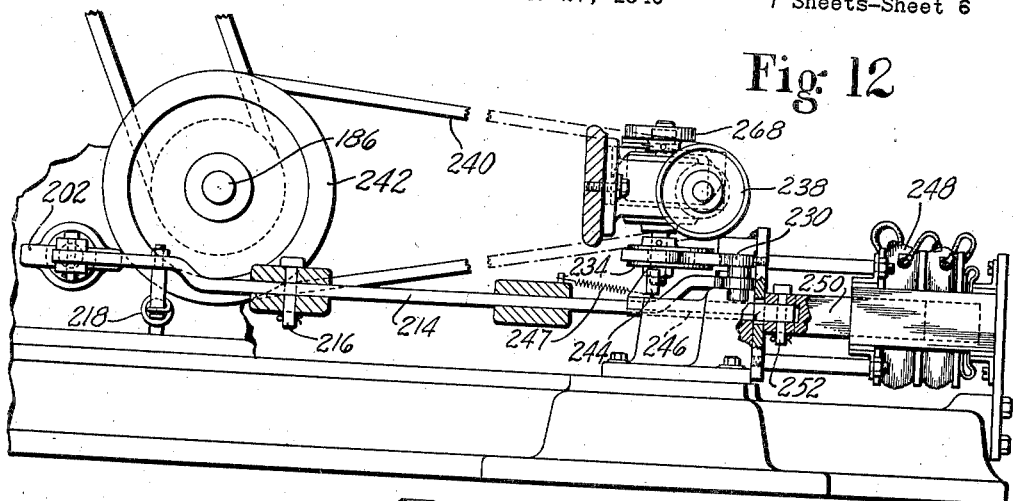
Fig. 12 is a view in side elevation, partly in section, illustrating mechanism for controlling the operation of the presser member.

The presser member is operatively connected to a lever 102 forming part of the driving mechanism 24 by toggle mechanism. This mechanism comprises a link 104 one end of which is pivotally connected to an ear 106 on the frame 10 and the other end of which is connected to a pin 108 carried by the lever 102. As shown in Fig. 11, the upper end of the link 104 is forked and embraces a forked end 110 of the link 102 which in turn embraces a second toggle link 112. The pin 108 is provided with an eccentric 114 secured thereto by set screws 116 and engaged in an opening in the link 112. The effective length of the link 112 can be adjusted by rotating the eccentric 114 and may be locked in adjusted position by a set screw 118. The link 112 extends generally in a vertical direction and is of such length that its upper end surface 113 can be brought into juxtaposition to the pin 96 at the rearward end of the presser member 114, when the latter is in substantially horizontal position. This is accomplished during movement of the presser member into work engaging position by an arm 120, one end of which is pivoted on the pin 96 and is also secured intermediate of its ends to a pivot 121 on the link 112. This construction is such that as the presser member is rotated in a counterclockwise direction (Figs. 1 and 5) the link 112 will be swung to the left until its upper end surface 113 engages the pin 96. The link is locked in this position by a latch 122 carried by the link and engaged by a dog 124, formed on the free end of a bell-crank lever 126 pivoted to the presser member at 128. The dog 124 is normally forced into latch-engaging position by means of a rod 130 which has at one end a ring 132 adapted to fit over a pin 134 on the lever, there being a spring 136 normally operative to force the rod and consequently the lever and dog to the left, as shown in Fig. 5. The movement of the lever 112 is limited by a stop screw 138 carried by the arm 120 and which engages a boss 140 on the lever 112.

The handle 22 comprises a bar which is carried by two arms 142 secured to a shaft 144 pivotally mounted in the presser member. Connected to the shaft 144 is a cam 146 arranged to engage the end 148 of the rod 130 to release the latch when the handle is permitted to rotate in a clockwise direction, as when the operator releases it. This same member then causes movement of the bellcrank 126 in a counterclockwise direction to raise the dog 124 out of engagement with the latch 122. The handle 22 is normally forced in a clockwise direction by a spring 150 surrounding a rod 152 slidably mounted in a boss 154 on the presser member and connected by a link 156 to the handle 22.

It is to be noted that when the toggle mechanisms 46, 48 and 104, 112 are straightened at such time as the presser member is in engagement with the work, as shown in Fig. 5, the work support 12 and the presser member 14 will be forced toward each other to effect a dieing out operation upon the work.

The mechanism for actuating the toggles will now be described. As has been previously pointed out, the toggles are connected to levers 44 and 102. These levers are, in turn, connected to an eccentric or crank 158 (Figs. 6, 7, 8 and 9) formed on the end of a shaft 160. The shaft 160 is rotatably mounted in a sleeve 162 which is supported in journals 164 by antifriction bearings 166. The shaft 160 is rotated on its axis by a spiral mesh gear 168 which is operatively connected to a disk 170 fast on an end of the shaft by means of an Oldham coupling comprising a floating plate 172 having projections 174 engaged in slots 176 in the disk and having projections 178 which engage lugs 180 on a hub 182 of the gear 168. The gear itself is rotated by a pinion 184 on a shaft 186 driven by an electric motor 188. The sleeve 162 is normally adapted to be rotated in the same direction as the gear 168 through a stub shaft 190, which has keyed thereto a gear 192 in mesh with gear 168 and a second gear 194 in mesh with a spiral gear 196 which is keyed to the sleeve. Upon rotation of the gear 168 the sleeve 162 will be caused to rotate with the gear carrying the shaft 160 bodily with it with the result that the axis of the shaft will revolve about the axis of the sleeve. At the same time the shaft will be caused to rotate on its own axis through engagement of the floating plate 172 with the gear 168. At this time the axis of the eccentric 158 is located coaxially of the sleeve and the net result of the rotation of the shaft with the sleeve and its rotation about its own axis is that the eccentric will rotate about the axis of the sleeve without causing any movement of the levers 44 and 102.

Provision is made for varying the position of the eccentric relatively to the axis of the sleeve in order to move the levers 44 and 102 to straighten the toggles. To accomplish this, the shaft 190 is arranged for sliding movement in its bearings 198 and 200. When the shaft is moved to the right in Fig. 7, the gear 192 will be caused to rotate faster than previously due to the contact of the teeth with those of gear 168, thus causing the shaft 190 to travel at a greater speed. At this time the gear 194 will act upon the teeth of the gear 196 to decrease the speed of the latter relative to that of gear 168, with the result that the sleeve 162 will be rotated more slowly than the shaft 160. Because of this, the shaft 160 will not revolve with the sleeve as before and the rotation on its own axis will throw the axis of the eccentric 158 outwardly from the axis of the sleeve, with the result that the eccentric will cause movement of the links 44 and 102, respectively, to straighten toggle links 46, 48 and 104, 112. When the shaft 180 is moved in the opposite direction, the result will be just the reverse and the eccentric will again be drawn into position with its axis coincident with the axis of the sleeve returning the toggles to their original positions.

The mechanism for controlling movement of the shaft 190 to cause operation of the driving pin 158 will now be described. The shaft 190 is moved in an axial direction by means of a yoke 202 secured to a collar 204, embracing the shaft and arranged to engage two sets of ball bearings 206 located upon opposite sides of the collar and engaging two stops 208 and 210 keyed to the shaft 190. This construction facilitates rotation of the shaft 190, while at the same time making it possible readily to move the shaft back and forth in an axial direction. The yoke is moved by means of a link 212 pivoted to a lever 214 mounted on a pin 216 on the frame. There is a spring 218 connecting the pivot link 104 with the lever 214, in such manner as normally to force the shaft 190 to the left in Fig. 7.

Figure 13:
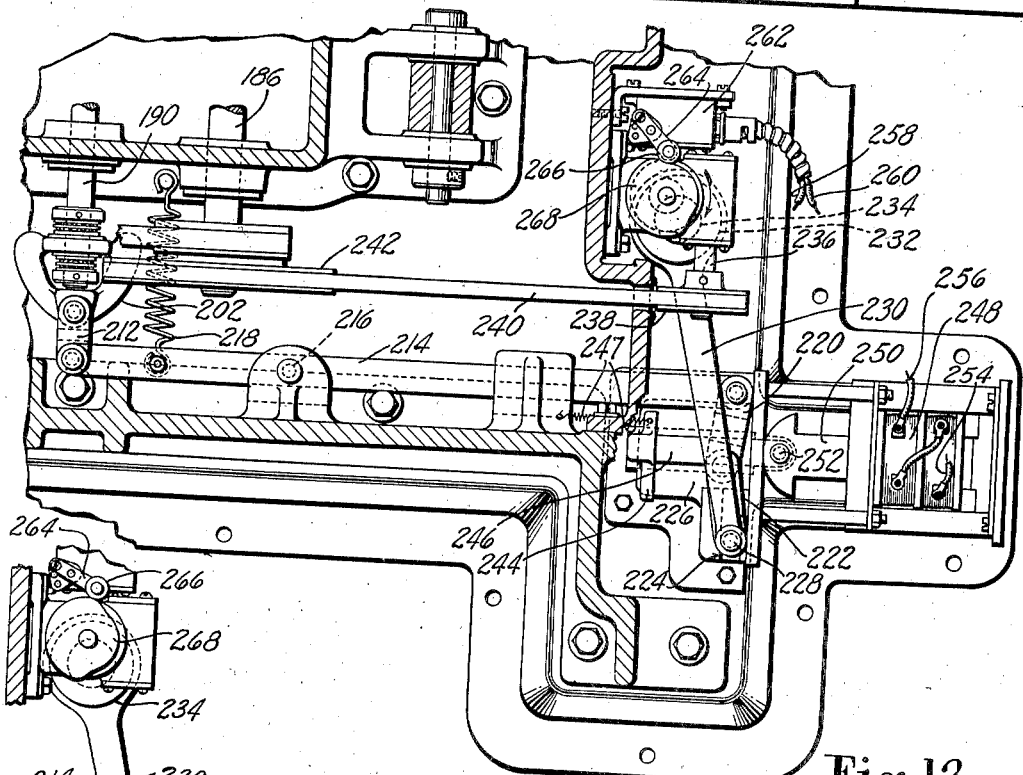
Fig. 13 is a plan view, partly in section, of the control mechanism illustrated in Fig. 12.

Mechanism is provided for actuating the lever 214 in timed relation to rotation of the drive shaft 186. To this end, the outer end of the lever 214 has operatively connected to it two toggle links 220 and 222 (Fig. 13). The outer end of the toggle link 222 is constrained to move along a groove 224 in a bracket 226 by means of a pin 228. Secured to the pin 228 is a connecting rod 230 arranged to be driven by an eccentric 232 on a shaft 234, which is driven by a shaft 236 through reducing gears (not shown). The shaft 236 carries a pulley 238 driven by a belt 240, which passes over a pulley 242 on the main drive shaft 186. As the main drive shaft rotates, the connecting rod 230 is reciprocated causing the toggle links 220 and 222 to oscillate without effecting any movement of the lever 214. Operation of the shaft 190 is effected by means of a locking device comprising a plate 244 mounted upon a slide 246, arranged to be moved toward the toggle links and operable to hold them in straightened condition, so that operation of the connecting rod 230 will cause an actuation of the lever 214. The plate 244 is arranged to be moved against tension of a spring 247 by means of a solenoid 248 having a plunger 250 secured to the slide 246 by a pin 252. The solenoid is operated by an electric current passing through leads 254 and 256, the circuit including lead wires 258 and 260 extending from opposite sides of a switch 262. The switch is operated by an arm 264 carrying a roll 266 arranged to engage a rotating cam 268. The shape of the cam is such that during a part of the revolution thereof the high part of the cam will operate to throw the arm 264 of the switch in a direction to close the circuit through the switch only at such times as the lower end of the lever 230 is near the bottom of its stroke with the links 220 and 222 in positions in which they can readily be locked in straightened condition by the member 244.

Figure 14:
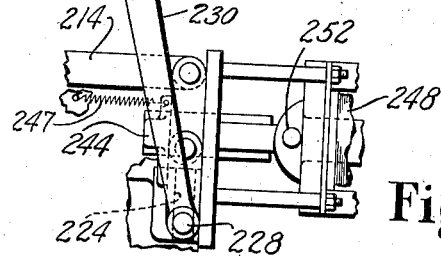
Fig. 14 is a plan view illustrating the operation of a portion of the control mechanism.

Fig. 13 shows the position of the parts when the circuit is open, and Fig. 14 shows the parts in the position they occupy at the moment that the circuit is closed, with the locking plate 244 holding the toggle links in the straightened condition prior to a movement of the connecting rod 230 in a direction to cause actuation of the lever 214 in a direction to move the shaft 190 to the right in Fig. 7.

The machine is provided with electrical control devices, which prevent power operation of the presser until the latter has been lowered to a position so close to the work that the operator cannot place his fingers between the striking surface and the work. To this end, the presser arm is provided with a switch 270, having an operating lever 271 arranged to be moved to close the circuit through the switch by a cam 272 mounted upon the shaft 86, so arranged that the switch is closed by rotation of the cam when the presser arm is in the position shown in Fig. 5 with the striking plate 84 almost in contact with the work. This construction thus eliminates any possibility of the operator's fingers being caught between the presser member and the work during a power operation of the presser member.

For initiating an operation of the presser member after it has been brought down close to or in contact with the work, there is provided a switch 274 mounted on the arm and arranged to be operated upon depression of the handle 22, there being a stud 276 secured to the rod 152 which is arranged to engage a switch operating pin 278 upon forward movement of the stud with the rod 152.

Figure 15:
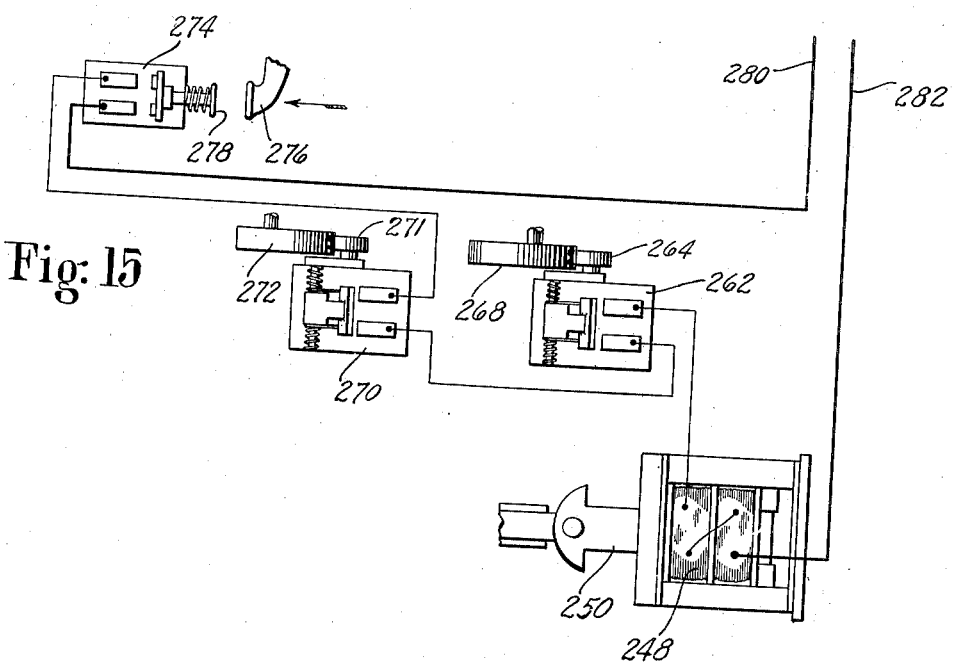
Fig. 15 is a diagrammatic view of a wiring diagram for the starting mechanism.

The control mechanism in its electrical aspect is best illustrated in Fig. 15. The circuit includes the power leads 280 and 282. A complete circuit includes the solenoid 248 and the three switches 262, 270 and 274 arranged in series. In order to produce an actuation of the solenoid to initiate a pressure applying operation, all three switches must be closed. That is accomplished by rotating the beam until it is close to the work to effect closing of the switch 270, depressing the handle 22 to close switch 274 after which, when the connecting rod 230 has moved into a position to effect operation of the toggles, the cam 268 will operate to close the switch 262.

In the operation of the machine, assuming that the presser member 14 is located as shown in Fig. 1 with the striking face 78 away from the cutting block 20, the operator places the die 16 upon the sheet material 18 in position to produce a desired cut. He then grasps the handle 22 and pulls it downwardly, swinging the presser member about the axis of its supporting shaft 86. As the striking face 84 approaches the die, the arm 120 draws the link 112 inwardly until its upper surface 113 engages the pin 96 on the underside of the rearward portion of the presser member 14 and the spring 136 moves the latch 126 to lock the link in engagement with the member. During the last part of the movement of the presser member, when the member is close to the die, the switch 270 in the power control circuit is closed, and upon further downward movement of the handle 22 the switch 274 is closed, initiating an operation of the solenoid 248 to effect power operation of the toggles 46, 48, and the link 112, which move the block 20 and striking face 84 toward each other in a pressure applying operation, forcing the die through the material at high speed to produce a clean cut blank. After such an operation the operator moves the handle 22 upwardly causing the rod 130 to release the latch 126, and the spring 92 rotates the presser member away from the block into inoperative position.

Having described my invention, what I claim as new and desire to secure by Letters Patent of the United States is:

1. A press comprising a frame, a work support mounted for movement heightwise of the frame, a presser member mounted in the frame for movement about a horizontal axis toward and away from the work support, power means for moving the work support and presser member toward each other, manually operable means for initiating an operation of the power means, and a second manually operable means for disconnecting the presser member from the power means.

2. A clicking machine comprising a frame, a work support mounted for movement heightwise of the frame, a presser member mounted for angular movement about an axis extending along one side of the support, and means for causing simultaneous movements of the support and presser member toward each other.

3. A press comprising a frame, a work support movable heightwise of the frame, a presser member mounted in the frame for movement about a horizontal axis, manual means for moving the presser member about the axis, and power operated means for moving the work support toward the presser member.

4. A press comprising a frame, a work support mounteed for movement heightwise of the frame, a presser member mounted in the frame for angular movement about a horizontal axis, and power-operated means for moving the support and presser member toward each other.

5. A clicking machine comprising a frame, a work support mounted for movement heightwise of the frame, a presser member mounted for angular movement manually about an axis extending along one side of the support, means for locking the presser against movement manually, and power means for causing movements of the support and presser member toward each other.

6. A clicking machine comprising a cutting block, a presser arm mounted upon an axis extending along one side of the block and having portions extending upon opposite sides of the axis, a striking face carried by one of said portions, a link movable into operative engagement with the other of said portions, and power operated means for actuating the link to force the striking face toward the cutting block.

7. A clicking machine comprising a frame, a work support mounted upon the frame, a presser arm mounted upon the frame for movement angularly toward or away from the work support, manually operated means for moving the arm toward the support, power operated means for causing a pressure applying operation of the arm, a releasable connection between the power operated means and the presser arm, means for rendering the connection operative when the presser member has been moved close to the work support, and manually operated means for releasing the connection thereby to render the same inoperative.

8. A clicking machine comprising a cutting block, a presser arm mounted upon an axis extending along one side of the block and having portions extending upon opposite sides of the axis, a striking face carried by one of said portions, a link movable into operative engagement with the other of said portions, a latch for securing the link in operative engagement with the presser arm, power operated means for actuating the link thereby to force the striking face toward the cutting block, manually operated means for moving the striking face toward or away from the cutting block, and means operable in response to movement of the manually operable means in moving the striking face away from the block for releasing the latch.

9. A press comprising a cutting block, a presser arm mounted upon an axis extending along one side of the block and having portions extending upon opposite sides of the axis, a striking face carried by one of said portions, a link movable into operative engagement with the other of said portions, power operated means for actuating the link thereby to force the striking face toward the cutting block, and manually operated means for disengaging the link from the presser arm.

10. A clicking machine comprising a cutting block, a presser arm mounted upon an axis extending along one side of the block and having portions extending upon opposite sides of the axis, a striking face carried by one of said portions, a link movable into operative engagement with the other of said portions, a latch for securing the link in operative engagement with the presser arm, power operated means for actuating the link thereby to force the striking face toward the cutting block, manually operated means for moving the striking face toward or away from the cutting block, and means operable in response to movement of the manually operable means in moving the striking face away from the block for releasing the latch thereby to disengage the link.

11. A clicking machine comprising a cutting block, a presser arm mounted upon an axis extending along one side of the block and having portions extending upon opposite sides of the axis, a striking face carried by one of said portions, a link movable into operative engagement with the other of said portions, power operated means for actuating the link thereby to force the striking face toward the cutting block, resilient means normally operative to rotate the presser arm in a direction to move the striking face away from the block, and manually operated means for disengaging the link from the presser arm.

12. A clicking machine comprising a cutting block, a presser member movable angularly toward or away from the cutting block and having a free end portion extending rearwardly of the member, a driving link having a portion arranged to engage the free end portion of the presser member, manually operated means for moving the presser member toward or away from the block, connections between the presser member and the driving link for causing engagement of the link with the presser member when the member is positioned adjacent to the block, and power operated means for causing operation of the link to force the presser member toward the block.

13. A clicking machine comprising a cutting block, a presser member movable angularly toward or away from the cutting block and having a free end portion extending rearwardly of the member, a driving link having a portion adapted to engage the free end portion of the presser member, manually operated means for moving the presser member toward or away from the block, connections between the presser member and the driving link for causing engagement of the link with the presser member when the member is positioned adjacent to the block, power operated means for causing operation of the link to force the presser member toward the block, and a latch for retaining the link in engagement with the presser member during power operation thereof.

14. A clicking machine comprising a cutting block, a presser member movable angularly toward or away from the cutting block and having a free end portion extending rearwardly of the member, a driving link having a portion adapted to engage the free end portion of the presser member, manually operated means for moving the presser member toward or away from the block, connections between the presser member and the driving link for causing engagement of the link with the presser member when the member is positioned adjacent to the block, power operated means for causing operation of the link to force the presser member toward the block, a latch for retaining the link in engagement with the presser member during power operation thereof, and manually operated means for releasing the latch upon movement of the presser member away from the block.

15. A clicking machine comprising a cutting block, a presser member having a portion movable toward or away from the cutting block and having a free end portion extending rearwardly of the member, a driving link adapted to engage the free end portion of the presser member, manually operated means for moving the presser member toward or away from the block, connections between the presser member and the dirving link for causing engagement of the link with the presser member when the member is positioned adjacent to the block, power operated means for causing operation of the link to force the presser member toward the block, a latch for retaining the link in engagement with the presser member during power operation thereof, and means associated with the manually operable means for releasing the latch.

16. A press comprising a work support, a presser member mounted for angular movement about a horizontal axis and having a striking face for applying pressure to work positioned on the support, a link mounted for movement into or out of operative engagement with the presser member, connections between the pressure member and the link operable during preliminary movement of the presser member toward the support for causing engagement of the link with the presser member, and power operated means for causing the link to force the striking face toward the work support.

17. A clicking machine comprising a cutting block, a presser member mounted upon an axis extending along one side of the block and having a striking portion located upon one side of the axis and a free end portion located upon the opposite side of the axis, manually operable means for swinging the presser member about its axis in moving the striking portion toward or away from the block, a spring normally operative to maintain the presser member in a position away from the block, a driving link movable into engagement with the free end portion of the presser member, and means operated as the striking portion is moved toward the block to cause engagement of the link with the presser member.

18. A press comprising a frame, a work support movable heightwise of the frame, a presser member mounted for movement toward and away from the work support, toggles connected to the work support and to the presser member, a power driven eccentric normally rotatable about its own axis, links connecting the toggles and the eccentric, and means for varying the throw of the eccentric to cause actuation of the toggles thereby to effect movement of the support and presser member toward each other.

19. A press comprising a frame, a work support mounted on the frame, a presser member mounted upon the frame for movement toward and away from the work support, a toggle connected to the presser member, a power driven eccentric normally rotatable about its own axis, a link connecting the eccentric and the toggle, and means for varying the throw of the eccentric thereby actuating the toggle to effect a movement of the presser member toward the work support.

20. A press comprising a frame, a work support mounted upon the frame, a presser member mounted for movement toward and away from the work support, a power driven eccentric normally rotatable about its own axis, an operating connection between the eccentric and the presser member, and means for varying the throw of the eccentric to effect a movement of the presser member toward the work support.

21. A clicking machine comprising a frame, a work support mounted upon the frame, a presser member pivotally mounted upon the frame, manually operated means for moving the presser member toward the work support, a power driven eccentric, operating connections between the eccentric and the presser member, means for causing the eccentric normally to rotate about its own axis, and means operable in response to operation of the manually operable means for varying the throw of the eccentric thereby causing a power operated movement of the presser member toward the work support.

22. A press comprising a work support, a presser member mounted upon an axis extending along one side of the support and arranged for angular movements about the axis toward or away from the support, a link movable into position with an end thereof engaging a portion of the presser member, a latch for securing the link in position, and power operated means for actuating the link thereby to cause a pressure applying operation of the presser member.

23. A clicking machine comprising a cutting block, a presser arm mounted upon an axis extending along one side of the block for movements toward or away from the block, a manually operable member for moving the presser arm about its axis, power means, operating connections between the power means and the presser arm for causing a pressure applying operation of the arm, an electric circuit for controlling operation of the power means including a plurality of switches, and means operable upon movement of the presser arm into juxtaposition to the cutting block for operating one of the switches to close the circuit therethrough.

24. A clicking machine comprising a cutting block, a presser arm mounted upon an axis extending along one side of the block for movements toward or away from the block, a starting handle for moving the presser arm about its axis, power means, operating connections between the power means and the presser arm for causing a pressure applying operation of the arm, an electric circuit for controlling operations of the power means including a plurality of switches, means responsive to initial operation of the starting handle in causing movement of the presser arm into juxtaposition to the cutting block for operating one of the switches to close the circuit therethrough, and means operable in response to continued operation of the starting handle for operating another of the switches to close the circuit therethrough thereby to initiate a pressure applying operation.

25. A press comprising a frame, a work support having a body portion slidably mounted in the frame, a plurality of guide members projecting from the body portion, a plurality of studs carried by the frame, each of the studs having an eccentric located in alinement with one of the guide members, and rolls on the eccentric constructed and arranged to bear against the guide members.

26. A press comprising a hollow frame, a work support having a depending portion positioned within the frame and spaced therefrom, means for moving the support heightwise of the frame, and means for guiding the work support during its movements comprising ribs on the depending portion, studs rotatably mounted upon the frame and having each an eccentric in alinement with one of the ribs, and rolls on the eccentric constructed and arranged to bear against the ribs.

27. A clicking machine comprising a work support, a presser member movable toward and away from the support, a rotary shaft, a crank carried by the shaft, operating connections between the presser member and the crank member, means for imparting rotational movement to the shaft upon its own axis and for revolving the shaft bodily in an orbit about a parallel axis, said axes being spaced apart by a distance equal to the eccentricity of the crank, and means for varying the respective angular movements of the shaft about said axes to vary the throw of the crank thereby to produce a movement of the presser member toward the work support.

28. A clicking machine comprising a frame, a work support mounted for movement heightwise of the frame, a presser member mounted upon the frame for movement toward and away from the work support, a rotary shaft, a crank carried by the shaft, a toggle member connected to the work support, operating connections between the crank and the toggle member, means for imparting rotational movement of the shaft upon its own axis and for revolving the shaft bodily in an orbit about a parallel axis, said axes being spaced apart by a distance equal to the eccentricity of the crank, and means for varying the respective angular movements of the shaft about said axes to vary the throw of the crank thereby to produce a movement of the work support toward the presser member.

29. A clicking machine comprising a work support, a presser member mounted for movement toward and away from the work support, a rotary shaft, a crank carried by the shaft, means normally operating to impart rotational movement to the shaft on its own axis and orbital movement of the shaft in the same direction and at the same angular velocity about a parallel axis, said axes being spaced apart by a distance equal to the eccentricity of the crank, and means for varying the angular velocity of the shaft in its respective movements to vary the throw of the crank thereby to produce a pressure-applying operation of the presser member upon the work support.

30. A clicking machine comprising a frame, a work support mounted for movement heightwise of the frame, a presser member mounted upon the frame for movement manually toward and away from the work support, a shaft, a crank carried by the shaft, means normally operating to impart rotational movement of the shaft on its own axis and orbital movement of the shaft in the same direction and at the same angular velocity about a parallel axis, said axes being spaced apart by a distance equal to the eccentricity of the crank, operating connections between the crank and the work support and between the crank and the presser member, and means operable in response to operation of the manually operable means for varying the angular velocity of the shaft in its respective movements to vary the throw of the crank thereby to effect movement of the work support and presser member toward each other.

31. A clicking machine comprising a frame, a work support mounted upon the frame, a presser member mounted in the frame for angular movement about a horizontal axis, a rotary shaft, a crank carried by the shaft, a driving connection extending between the crank and the presser member, means for imparting rotational movement of the shaft on its own axis and for revolving the shaft bodily in an orbit about a parallel axis, said axes being spaced apart a distance equal to the eccentricity of the crank, and means for varying the respective angular movements of the shaft about said axes to vary the throw of the crank thereby to effect a movement of the presser member toward the work support.

GEORGE F. RYAN.